United States Patent
Shen et al.

(10) Patent No.: US 9,264,189 B2
(45) Date of Patent: Feb. 16, 2016

(54) METHOD AND DEVICE FOR DETECTING DOWNLINK CONTROL INFORMATION

(71) Applicant: Spreadtrum Communications (Shanghai) Co., Ltd., Shanghai (CN)

(72) Inventors: Xuqiang Shen, Shanghai (CN); Xiaojian Dong, Shanghai (CN)

(73) Assignee: SPREADTRUM COMMUNICATIONS (SHANGHAI) CO., LTD. (CN)

( * ) Notice: Subject to any disclaimer, the term of this patent is extended or adjusted under 35 U.S.C. 154(b) by 21 days.

(21) Appl. No.: 14/338,515

(22) Filed: Jul. 23, 2014

(65) Prior Publication Data

US 2015/0189625 A1    Jul. 2, 2015

(30) Foreign Application Priority Data

Dec. 31, 2013   (CN) .......................... 2013 1 0754389

(51) Int. Cl.
| | |
|---|---|
| *H04L 5/00* | (2006.01) |
| *H04L 27/26* | (2006.01) |
| *H04W 8/00* | (2009.01) |
| *H04W 52/02* | (2009.01) |
| *H04W 72/12* | (2009.01) |

(52) U.S. Cl.
CPC .............. *H04L 5/00* (2013.01); *H04L 27/2676* (2013.01); *H04L 27/2679* (2013.01); *H04W 8/00* (2013.01); *H04W 52/0229* (2013.01); *H04W 72/1278* (2013.01); *H04W 72/1289* (2013.01)

(58) Field of Classification Search
None
See application file for complete search history.

(56) References Cited

U.S. PATENT DOCUMENTS

| | | | | |
|---|---|---|---|---|
| 2009/0238091 | A1* | 9/2009 | Kim | ...................... H04L 5/0091 370/252 |
| 2010/0275083 | A1* | 10/2010 | Nam | .................. H03M 13/6306 714/748 |
| 2011/0038275 | A1* | 2/2011 | Kim | ....................... H04W 48/16 370/252 |
| 2013/0044706 | A1* | 2/2013 | Suzuki | ................ H04W 72/042 370/329 |
| 2015/0271006 | A1* | 9/2015 | Han | .................... H04L 27/3455 370/329 |

* cited by examiner

*Primary Examiner* — Christopher Crutchfield
(74) *Attorney, Agent, or Firm* — Cantor Colburn LLP

(57) ABSTRACT

A method and device for detecting DCI are provided. The method includes: obtaining intermediate data in DCI blind detection, the intermediate data including descrambled data, decoded data and detected RNTI values; determining data to be processed from the decoded data based on a matching result of the detected RNTI values and configured RNTI values; performing encoding, rate matching and modulation on the data to be processed to obtain modulated data; calculating confidence levels of the configured RNTI values based on the modulated data and the descrambled data; and when a maximum confidence level of the configured RNTI value is greater than a predetermined threshold of confidence level, determining that the data to be processed contains detected DCI. The probability of DCI misdetection may be reduced, and further the accuracy of uplink and downlink data on a mobile terminal and system stability may be ensured.

18 Claims, 3 Drawing Sheets

METHOD AND DEVICE FOR DETECTING DOWNLINK CONTROL INFORMATION

CROSS-REFERENCE TO RELATED APPLICATIONS

The present application claims priority to Chinese patent application No. 201310754389.4, filed on Dec. 31, 2013, and entitled "METHOD AND DEVICE FOR DETECTING DOWNLINK CONTROL INFORMATION", and the entire disclosure of which is incorporated herein by reference.

TECHNICAL FIELD

The present disclosure generally relates to communication technology field, and more particularly, to a method and device for detecting Downlink Control Information (DCI) in a Long Term Evolution (LTE) system.

BACKGROUND

In an LTE system, downlink data receiving at a mobile terminal includes Physical Downlink Control Channel (PDCCH) receiving. A PDCCH carries Downlink Control Information (DCI) of one or more mobile terminals. The DCI generally includes downlink scheduling and allocation information used in demodulating and decoding a Physical Downlink Shared Channel (PDSCH) when a mobile terminal receives the PDSCH, scheduling authorization information of sources and transmission format used in the mobile terminal transmitting data in a Physical Uplink Shared Channel (PUSCH), acknowledgement information transmitted in a shared channel, and uplink physical channel power control information.

A mobile terminal can blindly detect DCI in a received PDCCH based on a Radio Network Temporary Identifier (RNTI) value which is configured for the mobile terminal, decode the DCI and make configuration for receiving a PDSCH or sending a PUSCH based on the decoded PCI.

When receiving the PDCCH and blindly detecting the DCI, the mobile terminal needs to perform a Cyclic Redundancy Check (CRC) on a demodulation result in each search space, and match the demodulation result to the configured RNTI value. If the demodulation result matches the configured RNTI value, the corresponding DCI is determined to be DCI actually sent to the mobile terminal. According to LTE specifications, a mobile terminal can match 22 search spaces at most and one search space can detect data of one or two DCI length. That is, CRC and RNTI matching may be performed 44 times at most.

However, in LTE specifications, a 16-bit CRC is employed to save bits transmitted in a PDCCH. Too few CRC check bits may result in a certain degree of mismatching. Theoretically, a misdetection of DCI may occur every 1.5 seconds if RNTI matching is performed 44 times in each sub frame.

The misdetection of DCI may further lead to wrong configuration for reception of PDSCH or transmission of PUSCH, which will cause received downlink data to be discarded or downlink data to be wrongly transmitted and received. This, in turn, may result in package loss and reduce the throughput of the mobile terminal system. Besides, the wrong configuration may also cause the system abnormal and reduce the reliability and stability of the mobile terminal system.

In some technologies, a determination process is performed on whether DCI obtained by blind detection is valid or not. If it is determined that invalid information exists in parameters configured in a PDSCH or a PUSCH, the DCI is filtered out to avoid system instability resulted from abnormal configuration. However, it still happens that some DCI obtained by misdetection cannot be filtered out, especially when DCI obtained by misdetection is valid in itself, while the DCI is not the information that a base station actually sends to a mobile terminal.

In some technologies, in order to filter DCI, a threshold is set for a distance on a state machine shortest path output from convolutional decoding when DCI demodulation is performed. However, by this method, it often happens that the DCI that a base station actually sends to a mobile terminal is filtered out, while the DCI obtained by misdetection is retained.

Therefore, new DCI detection methods are needed to reduce the probability of DCI misdetection.

SUMMARY

In embodiments of the present disclosure, a method and device for detecting DCI are provided, which may reduce the probability of misdetection in DCI blind detection.

In one embodiment, a method for detecting DCI is provided, including:

obtaining intermediate data in DCI blind detection, the intermediate data including descrambled data $DataAftDescramble_i$, decoded data $DataAftDeConv_i$ and detected RNTI values $DetRnti_i$, where i is an index of a PDCCH search space;

determining data to be processed $DataAftDeConv_k$ from the decoded data $DataAftDeConv_i$ based on a matching result of the detected RNTI values $DetRnti_i$ and configured RNTI values $SetRnti_j$, where $k=i_0, i_1, \ldots, i_{K-1}$, and $i_0, i_1, \ldots, i_{K-1}$ differ from one another and are related to values of i in the detected RNTI values $DetRnti_i$ which match the configured RNTI values $SetRnti_j$;

performing encoding, rate matching and modulation on the data to be processed $DataAftDeConv_k$ to obtain modulated data $DataAftRebuildModulation_k$;

calculating confidence levels $C_k$ of the configured RNTI values $SetRnti_p$ based on the modulated data $DataAftRebuildModulation_k$ and the descrambled data $DataAftDescramble_k$, where values of p are equal to values of j in the configured RNTI values $SetRnti_j$ which match the detected RNTI values $DetRnti_k$; and when a maximum confidence level $(C_k)_{max}$ of the configured RNTI value $SetRnti_p$ is greater than a predetermined threshold of confidence level, it being determined that the data to be processed $DataAftDeConv_{kp}$ contains detected DCI, where kp is the value of k when the confidence level $C_k$ reaches the maximum value $(C_k)_{max}$.

Optionally, $DetRnti_i = TxCrc_i \text{ XOR } RxCrc_i$, where $TxCrc_i$ is CRC data in the decoded data $DataAftDeConv_i$ added by a sender, and $RxCrc_i$ is CRC check data obtained after CRC is performed on the decoded data $DataAftDeConv_i$ in which $TxCrc_i$ is removed.

Optionally, $i_0, i_1, \ldots, i_{K-1}$ may be values of i in all the detected RNTI values $DetRnti_i$ which match the configured RNTI values $SetRnti_j$.

Optionally, $i_0, i_1, \ldots, i_{K-1}$ may be values of i in a portion of the detected RNTI values $DetRnti_i$ extracted from all the detected RNTI values $DetRnti_i$ which match the configured RNTI values $SetRnti_j$.

Optionally, a distance on a state machine shortest path output from convolutional decoding, which corresponds to the extracted portion of the detected RNTI values $DetRnti_i$, may be less than a distance threshold.

Optionally, the confidence levels $C_k$ may be related to $C\_Temp_k$ which is dot product of the modulated data DataAftRebuildModulation$_k$ and the descrambled DataAftDescramble$_k$.

Optionally, the confidence levels $C_k$ may be calculated based on any one of the following formulas:

$C_k = \text{real}(C\_Temp_k);$ $C_k = \text{real}(C\_Temp_k) - \text{abs}(\text{imag}(C\_Temp_k));$ and $C_k = \text{real}(C\_Temp_k)/(\text{abs}(\text{imag}(C\_Temp_k)) + \text{const}).$ Optionally, the method may further include: performing filtering on the detected DCI.

Optionally, the filtering may include validity determination.

In one embodiment, a device for detecting DCI is provided, including:

an obtaining unit, configured to obtain intermediate data in DCI blind detection, the intermediate data including descrambled data DataAftDescramble$_i$, decoded data DataAftDeConv$_i$ and detected RNTI values DetRnti$_i$, where i is an index of a PDCCH search space;

a matching unit, configured to determine data to be processed DataAftDeConv$_k$ from the decoded data DataAftDeConv$_i$ based on a matching result of the detected RNTI values DetRnti$_i$ and configured RNTI values SetRnti$_j$, where k=i$_0$, i$_1$, ..., i$_{K-1}$, and i$_0$, i$_1$, ..., i$_{K-1}$ differ from one another and are related to values of i in the detected RNTI values DetRnti$_i$ which match the configured RNTI values SetRnti$_j$;

a processing unit, configured to perform encoding, rate matching and modulation on the data to be processed DataAftDeConv$_k$ to obtain modulated data DataAftRebuildModulation$_k$;

a calculating unit, configured to calculate confidence levels $C_k$ of the configured RNTI values SetRnti$_p$ based on the modulated data DataAftRebuildModulation$_k$ and the descrambled data DataAftDescramble$_k$, where values of p are equal to values of j in the configured RNTI values SetRnti$_j$ which match the detected RNTI values DetRnti$_k$; and a determining unit, configured to determine that the data to be processed DataAftDeConv$_{kp}$ contains detected DCI, when a maximum confidence level $(C_k)_{max}$ of the configured RNTI values SetRnti$_p$ is greater than a predetermined threshold of confidence level, where kp is the value of k when the confidence level $C_k$ reaches the maximum value $(C_k)_{max}$.

Optionally, the device may further include a filtering unit, configured to perform filtering on the detected DCI.

Optionally, the filtering unit may be configured to determine whether the detected DCI is valid.

In embodiments of the present disclosure, encoding, rate matching and modulation are performed on decoded PDCCH DCI which is detected and matched, so that data is restored to the data corresponding to a node after a receiver performs descrambling. Correlation is performed on the restored data and the received and descrambled soft bits, and a confidence level is calculated. Detected DCI is determined by comparing a maximum confidence level of configured RNTI values with a threshold of confidence level. In this manner, the reliability of the detected DCI and soft bits used in encoding may be determined to a high extent. The DCI obtained by misdetection resulted from RNTI mismatching due to randomizing CRC, may be effectively filtered out. Therefore, the instability and decreased rate of a system caused by DCI misdetection may be avoided.

DETAILED DESCRIPTION

Figure 1:
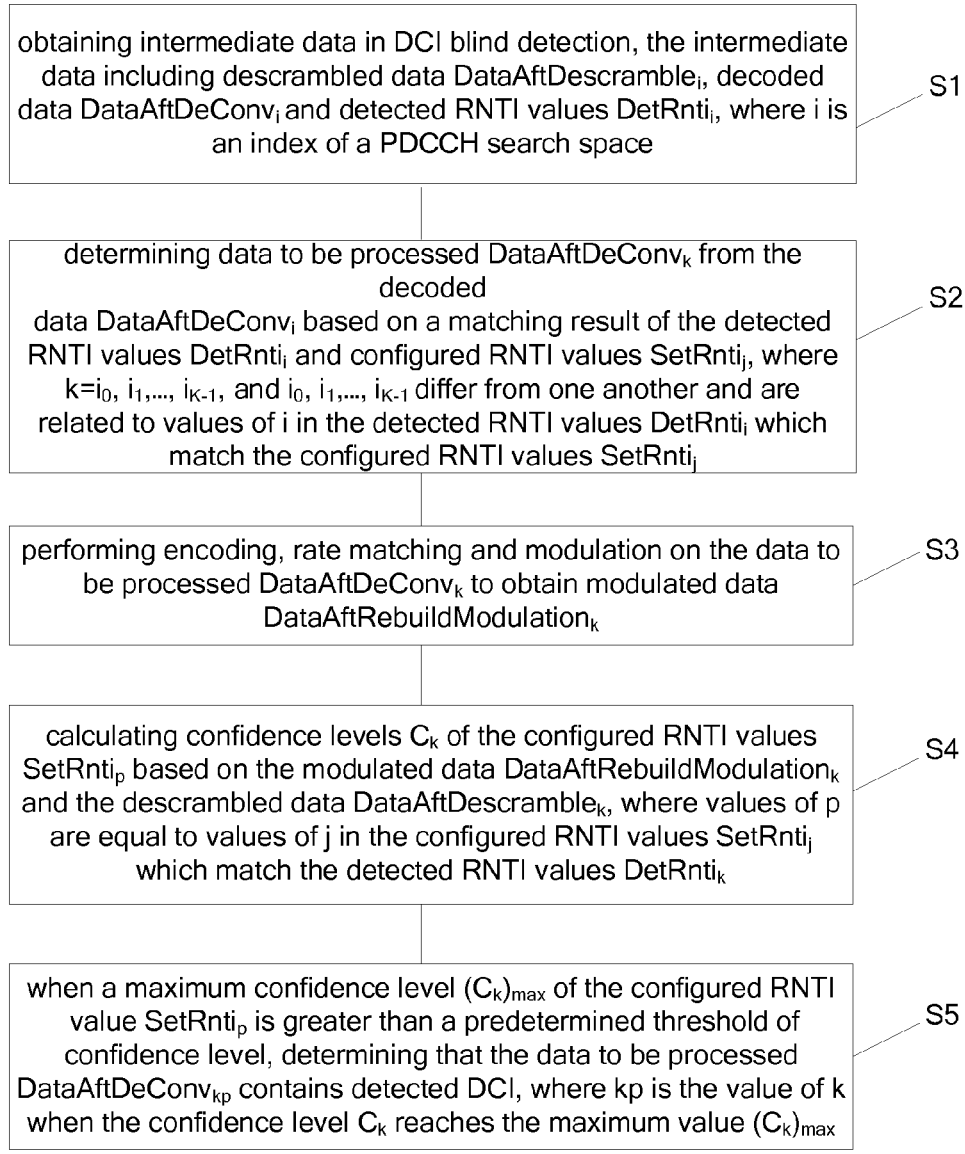
FIG. 1 schematically illustrates a flow chart of a method for detecting DCI according to some embodiments of the present disclosure.

FIG. 1 schematically illustrates a flow chart of a method for detecting DCI according to an embodiment of the present disclosure. The method includes:

S1, obtaining intermediate data in DCI blind detection, the intermediate data including descrambled data DataAftDescramble$_i$, decoded data DataAftDeConv$_i$ and detected RNTI values DetRnti$_i$, where i is an index of a PDCCH search space;

S2, determining data to be processed DataAftDeConv$_k$ from the decoded data DataAftDeConv$_i$ based on a matching result of the detected RNTI values DetRnti$_i$ and configured RNTI values SetRnti$_j$, where k=i$_0$, i$_1$, ..., i$_{K-1}$, and i$_0$, i$_1$, ..., i$_{K-1}$ differ from one another and are related to values of i in the detected RNTI values DetRnti$_i$ which match the configured RNTI values SetRnti$_j$;

S3, performing encoding, rate matching and modulation on the data to be processed DataAftDeConv$_k$ to obtain modulated data DataAftRebuildModulation$_k$;

S4, calculating confidence levels $C_k$ of the configured RNTI values SetRnti$_p$ based on the modulated data DataAftRebuildModulation$_k$ and the descrambled data DataAftDescramble$_k$, where values of p are equal to values of j in the configured RNTI values SetRnti$_j$ which match the detected RNTI values DetRnti$_k$; and S5, when a maximum confidence level $(C_k)_{max}$ of the configured RNTI value SetRnti$_p$ is greater than a predetermined threshold of confidence level, determining that the data to be processed DataAftDeConv$_{kp}$ contains detected DCI, where kp is the value of k when the confidence level $C_k$ reaches the maximum value $(C_k)_{max}$.

The above steps are described in detail below.

Figure 2:
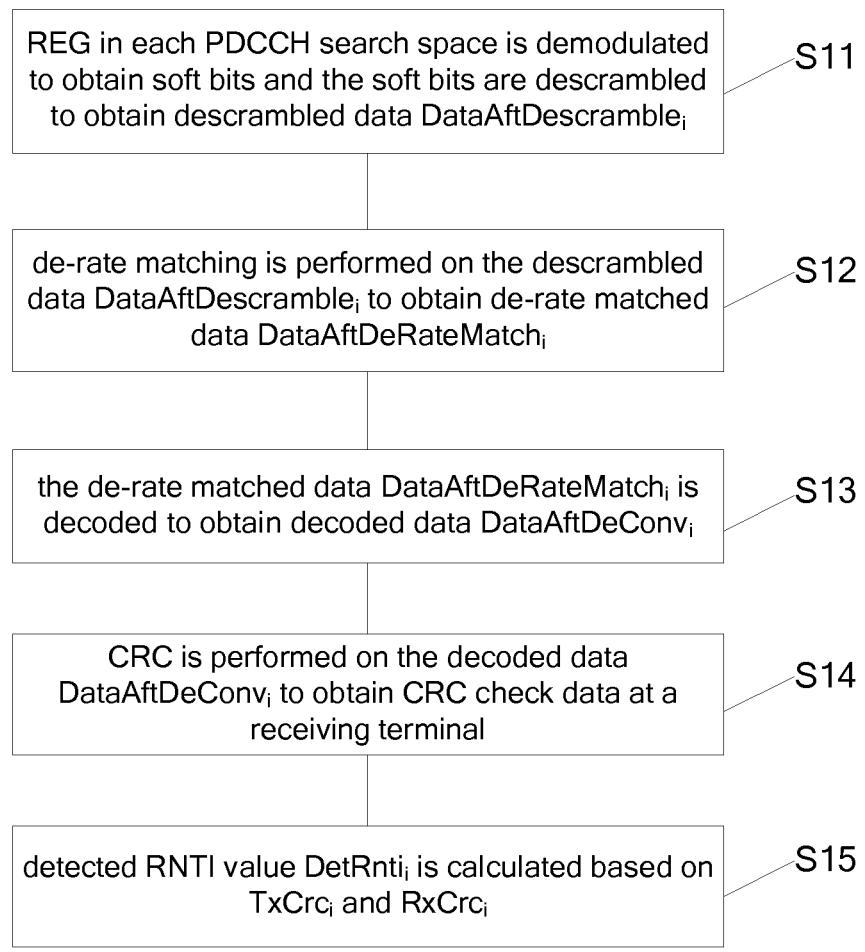
FIG. 2 schematically illustrates a flow chart of S1 in the method shown in FIG. 1.

Referring to FIG. 2 which shows a detailed flow of S1, obtaining intermediate data in DCI blind detection may include S11 to S15.

In S11, Resource Element Group (REG) in each PDCCH search space is demodulated to obtain soft bits and the soft bits are descrambled to obtain descrambled data DataAftDescramble$_i$.

DataAftDescramble$_i$ is vector data, and i represents the index of the PDCCH search spaces, i=0, 1, 2, ..., (NumOfCandidate-1), where NumOfCandidate is the number of the PDCCH search spaces. According to related protocols (such as 3GPP specification 36.212), a terminal receiver can match 22 PDCCH search spaces at most, i.e., NumOfCandidate<22. For example, if NumOfCandidate=10, the descrambled data includes DataAftDescramble$_0$, DataAftDescramble$_1$, DataAftDescramble$_2$, ... DataAftDescramble$_9$, where DataAftDescramble$_0$, DataAftDescramble$_1$, DataAftDescramble$_2$, ..., DataAftDescramble$_9$ are arrays. One PDCCH search space can detect data of one or two DCI length.

In S12, de-rate matching is performed on the descrambled data DataAftDescramble$_i$ to obtain de-rate matched data DataAftDeRateMatch$_i$.

In some embodiments, S12 may be an inverse process of a rate matching process stipulated in the related protocols. De-rate matching may be performed on the descrambled data DataAftDescramble$_i$ of each search space to obtain the de-rate matched data DataAftDeRateMatch$_i$, where DataAft-DeRateMatch$_i$ is vector data.

In S13, the de-rate matched data DataAftDeRateMatch$_i$ is decoded to obtain decoded data DataAftDeConv$_i$.

In some embodiments, S13 may be an inverse process of a convolutional encoding process stipulated in the related protocols. Convotional decoding may be performed on the de-rate matched data DataAftDeRateMatch$_i$ of each search space to obtain the decoded data DataAftDeConv$_i$. The last 16 bits in the decoded data DataAftDeConv$_i$ is CRC data added by a sending terminal (i.e., base station) and is represented by TxCrc$_i$. After removing the CRC data TxCrc$_i$ from the decoded data DataAftDeConv$_i$, the decoded data DataAftDe-Conv$_i$ may be taken as DCI obtained by the blind detection.

In S14, CRC is performed on the decoded data DataAft-DeConv$_i$ to obtain CRC check data at a receiving terminal.

In some embodiments, based on the related protocols, CRC may be performed on the decoded data DataAftDeConv$_i$ of each search space in which the CRC data TxCrc$_i$ has been removed, to obtain the CRC check data RxCrc$_i$ at the receiving terminal.

In S15, detected RNTI value DetRnti$_i$ is calculated based on TxCrc$_i$ and RxCrc$_i$.

In some embodiments, the detected RNTI value DetRnti$_i$ may be calculated based on the CRC data TxCrc$_i$ added by the sending terminal and the CRC check data RxCrc$_i$ at the receiving terminal in each search space, such as formula (1):

$$\text{DetRnti}_i = \text{TxCrc}_i \text{ XOR } \text{RxCrc}_i \quad (1),$$

where XOR represents an exclusive disjunction operation.

Referring to FIG. 1, in S2, data to be processed DataAft-DeConv$_k$ may be determined from the decoded data DataAft-DeConv$_i$ based on a matching result of the detected RNTI values DetRnti$_i$ and configured RNTI values SetRnti$_j$.

In some embodiments, the configured RNTI values SetRnti$_j$ are formed according to the related protocols and sent to the receiving terminal by the sending terminal, j=0, 1, . . . , J−1, where J is the number of the configured RNTI values and determined by the sending terminal. Each configured RNTI value SetRnti$_j$ is compared with the detected RNTI values DetRnti$_i$ in each search space, and if a configured RNTI value SetRnti$_j$ is equal to a detected RNTI value DetRnti$_i$, it is determined that the configured RNTI value SetRnti$_j$ matches the detected RNTI value DetRnti$_i$. Assuming X detected RNTI values in a search space are matched, DetRnti$_x$ is taken to represent these matched detected RNTI values, where x=i$_{\_0}$, i$_{\_1}$, . . . , i$_{\_{X-1}}$, i$_{\_0}$, i$_{\_1}$, . . . , i$_{\_{X-1}}$ differ from one another and represent values of i in the detected RNTI value DetRnti$_i$ which are matched. In one embodiment, there are three configured RNTI values, respectively being SetRnti$_0$, SetRnti$_1$, SetRnti$_2$. NumOfCandidate=10, that is, there are ten detected RNTI values, being DetRnti$_0$, DetRnti$_1$, DetRnti$_2$, . . . , DetRnti$_9$. If DetRnti$_1$ matches SetRnti$_0$, DetRnti$_3$, DetRnti$_5$ and DetRnti$_6$ match SetRnti$_1$, and DetRnti$_7$ and DetRnti$_8$ match SetRnti$_2$, the matched detected RNTI values include DetRnti$_1$, DetRnti$_3$, DetRnti$_5$, DetRnti$_6$, DetRnti$_7$ and DetRnti$_8$, X=6, and i$_{\_0}$, i$_{\_1}$, i$_{\_2}$, i$_{\_3}$, i$_{\_4}$ and i$_{\_5}$ may be set to, for example, 1, 3, 5, 6, 7 and 8, respectively.

Based on the matched detected RNTI values, the data to be processed DataAftDeConv$_k$ may be determined from all the decoded data DataAftDeConv$_i$.

In some embodiments, the decoded data DataAftDeConv$_i$ which corresponds to the matched detected RNTI values DetRnti$_x$ may be determined to be the data to be processed DataAftDeConv$_k$, where k=i$_0$, i$_1$, . . . , i$_{K-1}$, K=X, and i$_0$, i$_1$, . . . , i$_{K-1}$ correspond to i$_{\_0}$, i$_{\_1}$, . . . , i$_{\_{X-1}}$, respectively. As described in the above embodiment, the three configured RNTI values match the ten detected RNTI values. Thus, in the above embodiment, i$_0$=i$_{\_0}$=1, i$_1$=i$_{\_1}$=3, i$_2$=i$_{\_2}$=5, i$_3$=i$_{\_3}$=6, i$_4$=i$_{\_4}$=7, i$_5$=i$_{\_5}$=8, and the data to be processed DataAftDeConv$_k$ includes DataAftDeConv$_1$, DataAftDeConv$_3$, DataAftDeConv$_5$, DataAftDeConv$_6$, DataAftDeConv$_7$ and DataAftDeConv$_8$.

In some embodiments, to avoid unnecessary calculation to ensure that power consumption of a terminal is not increased, a method for filtering detected DCI may be performed to extract a portion of DCI from those obtained by the blind detection. DetRnti$_k$ corresponding to the extracted portion of DCI may be extracted from all the matched detected RNTI values DetRnti$_x$, and the decoded data corresponding to the extracted matched detected RNTI values DetRnti$_k$ may be determined to be the data to be processed DataAftDeConv$_k$, where k=i$_0$, i$_1$, . . . , i$_{K-1}$, K is the number of the extracted matched detected RNTI values, i$_0$, i$_1$, . . . , i$_{K-1}$ correspond to values of x in the extracted matched detected RNTI values, respectively. Still taking the above embodiment for example, among the ten matched detected RNTI values, three detected RNTI values DetRnti$_x$ may be extracted, where x is i$_{\_1}$, i$_{\_3}$ and i$_{\_4}$. Thus, the extracted matched detected RNTI values include DetRnti$_3$, DetRnti$_6$ and DetRnti$_7$, i$_0$=i$_{\_1}$=3, i$_1$=i$_{\_3}$=6, i$_2$=i$_{\_4}$=7, and the data to be processed includes DataAftDeConv$_3$, DataAftDeConv$_6$ and DataAftDeConv$_7$.

Existing methods may be employed to filter detected DCI. For example, whether a distance on a state machine shortest path output from convolutional decoding, which corresponds to the matched detected RNTI values DetRnti$_x$, is less than a distance threshold may be determined, and if yes, the decoded data corresponding to the matched detected RNTI values DetRnti$_x$ may be determined to be the data to be processed. Namely, the distance on the state machine shortest path output from convolutional decoding, which corresponds to the extracted matched detected RNTI values DetRnti$_x$, is less than the distance threshold. The distance on the state machine shortest path output from convolutional decoding may be obtained in S13, and the distance threshold may be determined based on protocols and practical situations.

Still referring to FIG. 1, in S3, encoding, rate matching and modulation are performed on the data to be processed DataAftDeConv$_k$ to obtain modulated data DataAftRebuild-Modulation$_k$.

In some embodiments, according to the related protocols, convotional encoding may be performed on the data to be processed DataAftDeConv$_k$ to obtain encoded data DataAftRebuildConv$_k$. Rate matching may be performed on the encoded data DataAftRebuildConv$_k$ to obtain rate matched data DataAftRebuildRatematch$_k$. Then, the rate matched data DataAftRebuildRatematch$_k$ may be modulated (namely, data is restored) to obtain the modulated data DataAftRebuildModulation$_k$ which is complex IQ vector data.

In S4, confidence levels $C_k$ of the configured RNTI values SetRnti$_p$ are calculated based on the modulated data DataAftRebuildModulation$_k$ and the descrambled data DataAftDescramble$_k$.

The confidence levels $C_k$ may be obtained by performing certain computation on the modulated data DataAftRebuild-Modulation$_k$ and the corresponding descrambled data DataAftDescramble$_k$. In some embodiments, dot product of the modulated data DataAftRebuildModulation$_k$ and the descrambled data DataAftDescramble$_k$ may be first calculated as follows:

$$C\_Temp_k = \sum_{m=0}^{M-1} DataAftRebuildModulation_k(m) * conj(DataAftDescramble_k(m)), \quad (2)$$

where M is the length of the vector data (array), and conj represents obtaining conjugation.

Based on C_Temp$_k$, the confidence levels C$_k$ may be calculated in many ways, such as formula (3), (4) or (5):

$$C_k = real(C\_Temp_k) \quad (3)$$

$$C_k = real(C\_Temp_k) - abs(imag(C\_Temp_k)) \quad (4)$$

$$C_k = real(C\_Temp_k)/(abs(imag(C\_Temp_k)) + const) \quad (5)$$

where real represents obtaining a real part, imag represents obtaining an imaginary part, abs represents obtaining an absolute value, and const represents a constant, such as zero or other values.

The calculated confidence levels C$_k$ are taken as the confidence levels C$_k$ of the configured RNTI values SetRnti$_p$, where p is values of j in the configured RNTI values SetRnti$_j$ which match the extracted matched detected RNTI values DetRnti$_k$. As described in the above embodiment, if DetRnti$_1$ matches SetRnti$_0$, DetRnti$_3$, DetRnti$_5$ and DetRnti$_6$ match SetRnti$_1$, and DetRnti$_7$ and DetRnti$_8$ match SetRnti$_2$, K=6, i$_0$=1, i$_{1=3}$, i$_{2=5}$, i$_{3=6}$, i$_{4=7}$, i$_{5=8}$, and the data to be processed DataAftDeConv$_k$ includes DataAftDeConv$_i$, DataAftDeConv$_3$, DataAftDeConv$_5$, DataAftDeConv$_6$, DataAftDeConv$_7$ and DataAftDeConv$_8$. Accordingly, the confidence level C$_1$ is the confidence level of SetRnti$_0$, the confidence levels C$_3$, C$_5$ and C$_6$ are the confidence levels of SetRnti$_1$, and the confidence levels C$_7$ and C$_8$ are the confidence levels of SetRnti$_2$. From above, one configured RNTI value may have multiple calculated confidence levels.

Still referring to FIG. 1, in S5, when a maximum confidence level $(C_k)_{max}$ Of the configured RNTI value SetRnti$_p$ is greater than a predetermined threshold of confidence level, it is determined that the data to be processed DataAftDeConv$_{kp}$ contains detected DCI, where kp is the value of k when the confidence level C$_k$ reaches the maximum value $(C_k)_{max}$.

In some embodiments, for each configured RNTI value SetRnti$_p$, a maximum confidence level, i.e., the maximum confidence level $(C_k)_{max}$ of the configured RNTI value SetRnti$_p$, may be determined. kp represents the value of k when the confidence level C$_k$ reaches the maximum value $(C_k)_{max}$. Besides, to the configured RNTI values SetRnti$_j$ which do not match any detected RNTI values DetRnti$_i$, their confidence levels may be set to be infinitesimal.

In some embodiments, for each configured RNTI value SetRnti$_p$, whether its maximum confidence level $(C_k)_{max}$ is greater than a predetermined threshold of confidence level may be determined, and if yes, it is determined that DCI obtained by the blind detection is detected DCI, that is, the data to be processed DataAftDeConv$_{kp}$ contains the detected DCI. The predetermined threshold of confidence level is a critical value used to determine the reliability of DCI, and may be determined based on experiments, or determined as an empirical value according to practical designing requirements, which is not limited in the disclosure.

For example, continuing the above embodiment described in S4, the confidence levels of SetRnti$_1$ include C$_3$, C$_5$ and C$_6$, and the maximum confidence level is C$_5$, that is, kp=5. If the confidence level C$_5$ is greater than the threshold of confidence level, it is determined that the data to be processed DataAftDeConv$_5$ contains the detected DCI. After CRC data added by the sending terminal is removed from the data to be processed DataAftDeConv$_5$, the data to be processed DataAftDeConv$_5$ is the detected DCI.

In some embodiments, the detected DCI may be determined to be valid information directly. To further improve the accuracy of DCI detection, in some embodiments, the DCI detection method may further include: performing filtering on the detected DCI. In some embodiments, existing methods for filtering detected DCI may be employed to filter or screen the detected DCI obtained in S5 to further determine valid DCI. For example, validity determination may be performed on the detected DCI obtained in S5 to filter out invalid DCI while other detected DCI may be determined as valid DCI.

Figure 3:
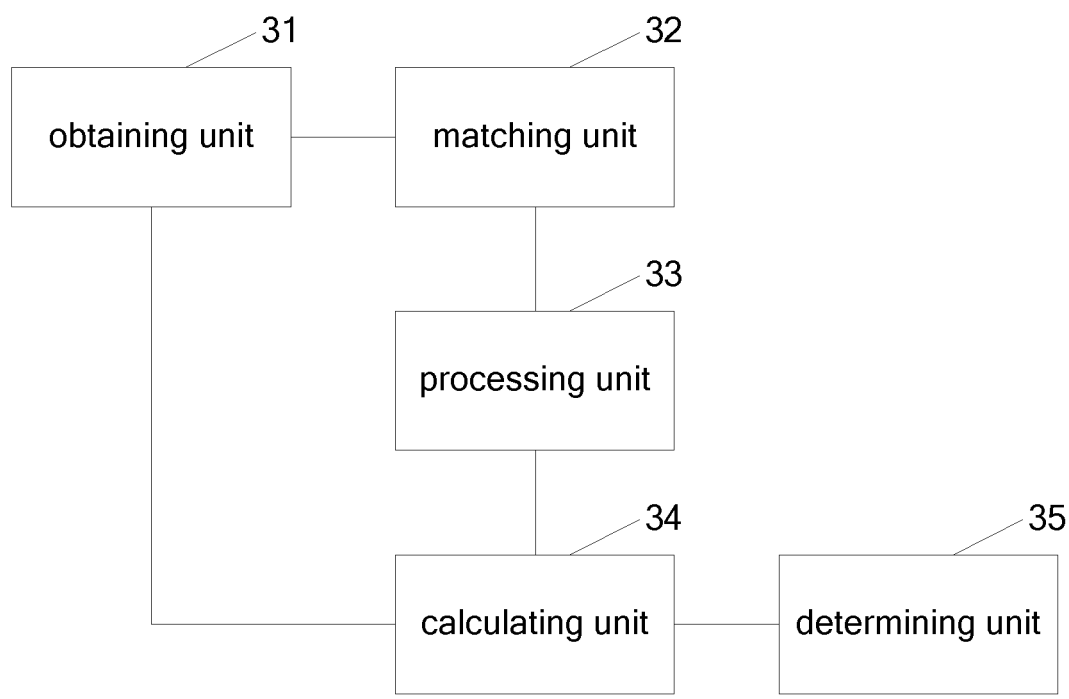
FIG. 3 schematically illustrates a structural diagram of a device for detecting DCI according to an embodiment of the present disclosure.

Accordingly, in one embodiment, a device for detecting DCI may be provided. Referring to FIG. 3, the device includes an obtaining unit 31, a matching unit 32, a processing unit 33, a calculating unit 34 and a determining unit 35.

The obtaining unit 31 may be configured to obtain intermediate data in DCI blind detection, the intermediate data including descrambled data DataAftDescramble$_i$, decoded data DataAftDeConv$_i$ and detected RNTI values DetRnti$_i$, where i is an index of a PDCCH search space.

The matching unit 32 may be configured to determine data to be processed DataAftDeConv$_k$ from the decoded data DataAftDeConv$_i$ based on a matching result of the detected RNTI values DetRnti$_i$ and configured RNTI values SetRnti$_j$ which are obtained in the obtaining unit 31, where k=i$_0$, i$_1$, ..., i$_{K-1}$, and i$_0$, i$_1$, ..., i$_{K-1}$ differ from one another and are related to values of i in the detected RNTI values DetRnti$_i$ which match the configured RNTI values SetRnti$_j$.

The processing unit 33 may be configured to perform encoding, rate matching and modulation on the data to be processed DataAftDeConv$_k$ which is determined in the matching unit 32 to obtain modulated data DataAftRebuildModulation$_k$.

The calculating unit 34 may be configured to calculate confidence levels C$_k$ of the configured RNTI values SetRnti$_p$ based on the modulated data DataAftRebuildModulation$_k$ obtained in the processing unit 33 and the descrambled data DataAftDescramble$_k$ obtained in the obtaining unit 31, where values of p are equal to values of j in the configured RNTI values SetRnti$_j$ which match the detected RNTI values DetRnti$_k$.

The determining unit 35 may be configured to determine that the data to be processed DataAftDeConv$_{kp}$ contains detected DCI, when a maximum confidence level $(C_k)_{max}$ of the configured RNTI value SetRnti$_p$ is greater than a predetermined threshold of confidence level, where kp is the value of k when the confidence level C$_k$ reaches the maximum value $(C_k)_{max}$.

A data processing procedure of the device for detecting DCI may be similar with that described in the method for detecting DCI, and is not described in detail here.

From the above, encoding, rate matching and modulation may be performed on decoded PDCCH DCI which is detected and matched, so that data is restored to the data corresponding to a node after a receiver performs descrambling. Correlation is performed on the restored data and the received and descrambled soft bits, and a confidence level is calculated. A maximum confidence level of configured RNTI values in each search space is determined, and the maximum confidence level is compared with a threshold of confidence level to determine detected DCI. In this manner, the probability of DCI misdetection may be reduced, and further the accuracy of uplink and downlink data on a mobile terminal and system stability may be ensured.

Those skilled in the art may understand that all or some of the processes in the embodiments described above can be realized by using computer programs to instruct corresponding hardware. The programs may be stored in a readable storage medium in a computer, such as Read-Only Memory (ROM), Random Access Memory (RAM), diskette, Compact Disc (CD) or the like.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure. Therefore, the protection scope of the present disclosure is subject to the scope defined by the claims.

What is claimed is:

1. A method for detecting Downlink Control Information (DCI), comprising:
   obtaining intermediate data in DCI blind detection, the intermediate data comprising descrambled data $DataAftDescramble_i$, decoded data $DataAftDeConv_i$ and detected RNTI values $DetRnti_i$, where i is an index of a Physical Downlink Control Channel (PDCCH) search space;
   determining data to be processed $DataAftDeConv_k$ from the decoded data $DataAftDeConv_i$ based on a matching result of the detected Radio Network Temporary Identifier (RNTI) values $DetRnti_i$ and configured RNTI values $SetRnti_j$, where $k=i_0, i_1, \ldots, i_{K-1}$, and $i_0, i_1, \ldots, i_{K-1}$ differ from one another and are related to values of i in the detected RNTI values $DetRnti_i$ which match the configured RNTI values $SetRnti_j$;
   performing encoding, rate matching and modulation on the data to be processed $DataAftDeConv_k$ to obtain modulated data $DataAftRebuildModulation_k$;
   calculating confidence levels $C_k$ of the configured RNTI values $SetRnti_p$ based on the modulated data $DataAftRebuildModulation_k$ and the descrambled data $DataAftDescramble_k$, where values of p are equal to values of j in the configured RNTI values $SetRnti_j$ which match the detected RNTI values $DetRnti_k$; and
   when a maximum confidence level $(C_k)_{max}$ of the configured RNTI value $SetRnti_p$ is greater than a predetermined threshold of confidence level, determining that the data to be processed $DataAftDeConv_{kp}$ contains detected DCI, where kp is the value of k when the confidence level $C_k$ reaches the maximum value $(C_k)_{max}$.

2. The method according to claim 1, wherein $DetRnti_i = TxCrc_i$ XOR $RxCrc_i$, where $TxCrc_i$ is Cyclic Redundancy Check (CRC) data in the decoded data $DataAftDeConv_i$ added by a sender, and $RxCrc_i$ is CRC check data obtained after CRC is performed on the decoded data $DataAftDeConv_i$ in which $TxCrc_i$ is removed.

3. The method according to claim 1, wherein $i_0, i_1, \ldots, i_{K-1}$ are values of i in all the detected RNTI values $DetRnti_i$ which match the configured RNTI values $SetRnti_j$.

4. The method according to claim 1, wherein $i_0, i_1, \ldots, i_{K-1}$ are values of i in a portion of the detected RNTI values $DetRnti_i$ extracted from all the detected RNTI values $DetRnti_i$ which match the configured RNTI values $SetRnti_j$.

5. The method according to claim 4, wherein a distance on a state machine shortest path output from convolutional decoding, which corresponds to the extracted portion of the detected RNTI values $DetRnti_i$, is less than a distance threshold.

6. The method according to claim 1, wherein the confidence levels $C_k$ are related to $C\_Temp_k$ which is dot product of the modulated data $DataAftRebuildModulation_k$ and the descrambled data $DataAftDescramble_k$.

7. The method according to claim 6, wherein the confidence levels $C_k$ is calculated based on any one of the following formulas:

$$C_k = real(C\_Temp_k);$$

$$C_k = real(C\_Temp_k) - abs(imag(C\_Temp_k));$$

and $$C_k = real(C\_Temp_k)/(abs(imag(C\_Temp_k)) + const).$$

8. The method according to claim 1, further comprising: performing filtering on the detected DCI.

9. The method according to claim 8, wherein the filtering comprises validity determination.

10. A device for detecting DCI, comprising:
    an obtaining unit, configured to obtain intermediate data in DCI blind detection, the intermediate data comprising descrambled data $DataAftDescramble_i$, decoded data $DataAftDeConv_i$ and detected RNTI values $DetRnti_i$, where i is an index of a PDCCH search space;
    a matching unit, configured to determine data to be processed $DataAftDeConv_k$ from the decoded data $DataAftDeConv_i$ based on a matching result of the detected RNTI values $DetRnti_i$ and configured RNTI values $SetRnti_j$, where $k=i_0, i_1, \ldots, i_{K-1}$, and $i_0, i_1, \ldots, i_{K-1}$ differ from one another and are related to values of i in the detected RNTI values $DetRnti_i$ which match the configured RNTI values $SetRnti_j$;
    a processing unit, configured to perform encoding, rate matching and modulation on the data to be processed $DataAftDeConv_k$ to obtain modulated data $DataAftRebuildModulation_k$;
    a calculating unit, configured to calculate confidence levels $C_k$ of the configured RNTI values $SetRnti_p$ based on the modulated data $DataAftRebuildModulation_k$ and the descrambled data $DataAftDescramble_k$, where values of p are equal to values of j in the configured RNTI values $SetRnti_j$ which match the detected RNTI values $DetRnti_k$; and
    a determination unit, configured to determine that the data to be processed $DataAftDeConv_{kp}$ contains detected DCI, when a maximum confidence level $(C_k)_{max}$ of the configured RNTI value $SetRnti_p$ is greater than a predetermined threshold of confidence level, where kp is the value of k when the confidence level $C_k$ reaches the maximum value $(C_k)_{max}$.

11. The device according to claim 10, wherein $DetRnti_i = TxCrc_i$ XOR $RxCrc_i$, where $TxCrc_i$ is CRC data in the decoded data $DataAftDeConv_i$ added by a sender, and $RxCrc_i$ is CRC check data obtained after CRC is performed on the decoded data $DataAftDeConv_i$ in which $TxCrc_i$ is removed.

12. The device according to claim 10, wherein $i_0, i_1, \ldots, i_{K-1}$ are values of i in all the detected RNTI values $DetRnti_i$ which match the configured RNTI values $SetRnti_j$.

13. The device according to claim 10, wherein $i_0, i_1, \ldots, i_{K-1}$ are values of i in a portion of the detected RNTI values $DetRnti_i$ extracted from all the detected RNTI values $DetRnti_i$ which match the configured RNTI values $SetRnti_j$.

14. The device according to claim 13, wherein a distance on a state machine shortest path output from convolutional decoding, which corresponds to the extracted portion of the detected RNTI values $DetRnti_i$, is less than a distance threshold.

15. The device according to claim 10, wherein the confidence levels $C_k$ are related to $C\_Temp_k$ which is dot product of the modulated data $DataAftRebuildModulation_k$ and the descrambled data $DataAftDescramble_k$.

16. The device according to claim 15, wherein the confidence levels $C_k$ are calculated based on any one of the following formulas:

$$C_k = \text{real}(C\_Temp_k);$$

$$C_k = \text{real}(C\_Temp_k) - \text{abs}(\text{imag}(C\_Temp_k));$$

and $$C_k = \text{real}(C\_Temp_k)/(\text{abs}(\text{imag}(C\_Temp_k)) + \text{const}).$$

17. The device according to claim 10, further comprising a filtering unit configured to perform filtering on the detected DCI.

18. The device according to claim 17, wherein the filtering unit is configured to determine whether the detected DCI is valid.

* * * * *